United States Patent
Jacquin et al.

(10) Patent No.: US 6,324,301 B1
(45) Date of Patent: Nov. 27, 2001

(54) ADAPTIVE POSTFILTER FOR LOW BITRATE VISUAL TELEPHONY NOISE REMOVAL

(75) Inventors: Arnaud Eric Jacquin, New York, NY (US); Hiroyuki Okada, Highlands, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 797 days.

(21) Appl. No.: 08/590,722

(22) Filed: Jan. 24, 1996

(51) Int. Cl.[7] ............................ G06K 9/00; G06K 9/36; H04N 3/08
(52) U.S. Cl. .......................... 382/166; 382/233; 358/539
(58) Field of Search .................................. 382/233, 239, 382/253, 260–265, 166; 358/532, 539; 348/417–420, 421; 341/50–51, 87; H04N 1/58, 1/64

(56) References Cited

U.S. PATENT DOCUMENTS

| | | | |
|---|---|---|---|
| 4,941,043 | 7/1990 | Jass | 358/133 |
| 5,313,298 * | 5/1994 | Meeker | 348/417 |
| 5,422,964 | 6/1995 | Devimeux et al. | 382/226 |
| 5,512,956 * | 4/1996 | Yan | 348/421 |
| 5,596,659 * | 1/1997 | Normile et al. | 382/253 |
| 5,649,031 * | 7/1997 | Nakamura et al. | 382/254 |
| 5,680,130 * | 10/1997 | Tsutsui et al. | 341/87 |

FOREIGN PATENT DOCUMENTS

| | | |
|---|---|---|
| 0 571 171 | 11/1993 | (EP) . |
| 0 679 031 | 11/1994 | (EP) . |
| 2 661 063 | 10/1991 | (FR) . |
| 2 287 153 | 9/1995 | (GB) . |

OTHER PUBLICATIONS

"Video Coding For Low Bitrate Communication", ITU–T, Telecommunication Standardization Sector of ITU, Draft H.263 (Dec. 5, 1995), Line Transmission of Non–Telephone Signals.

* cited by examiner

Primary Examiner—Madeleine Nguyen

(57) ABSTRACT

An adaptive postfiltering arrangement for decoding video images is disclosed wherein the postfilter parameters used to control the strength of the postfilter are computed by the encoder at the time the video images are encoded and are transmitted to the postfilter as side information contained in the video image bitstream. The postfilter removes distortions from decoded video images, derived as a result of DCT coefficient quantization errors produced when the image is compressed for transmission to a decoder, and is based on computation of signal-to-noise ratios (SNRs), of one or more components of encoded video images. Other information about image content, such as face location information, can also be included in the side information sent to the postfilter in the video image bitstream, to modulate the postfilter strength according to the image content.

16 Claims, 5 Drawing Sheets

ADAPTIVE POSTFILTER FOR LOW BITRATE VISUAL TELEPHONY NOISE REMOVAL

BACKGROUND OF THE INVENTION

1. Field of the Invention

The present invention relates generally to image processing systems and, more particularly, to coding schemes where color image signals are transmitted between encoding and decoding devices.

2. Description of the Related Art

Discrete Cosine Transform (DCT) based coding schemes lie at the heart of most modern image communications applications, including videophones, set-top-boxes for video-on-demand, and video teleconferencing systems. With discrete cosine transformation, an image, or more properly a rectangular array of samples representing an image component, is divided into several square image blocks with each block consisting of a spatial array of n×n samples. The image data samples in each image block are then encoded with an orthogonal transform using the cosine function.

In the Discrete Cosine Transform (DCT) method, the signal power of each image block is concentrated at specific frequency components. The distribution of signal power at those frequency components is then encoded by expressing it as a set of scalar coefficients of the cosine transform. By encoding only those coefficients, with correspondingly high concentrations of signal power, the amount of information, or data (i.e. data volume) which needs to be transmitted or recorded for representation of the original image is significantly reduced. In this manner, the image data information is encoded and compressed for transmission.

One problem with this method of image transmission is that the distribution of the coefficients of the signal power produced by the discrete cosine transform, directly affects the image coding efficiency and thus the compressibility of the data which needs to be transmitted. For example, when the video image to be coded is a flat pattern image, such as an image of the sky on a clear day, the discrete cosine transform coefficients (DCT coefficients) are concentrated in the low frequency components. As a result, the image information can be compressed and transmitted using a small number of coefficients, by merely coding the coefficients corresponding to low frequency components.

However, whenever the video image to be coded includes either contours, edges, or strongly textured patterns, such as a plaid pattern, the DCT coefficients are distributed broadly among both low and high power frequency components, requiring that a large number of coefficients be transmitted, thus reducing the coding efficiency and limiting the ability to transmit compressed image information on a low bit rate channel. To solve this problem, techniques such as coarsening ("rounding-off") the values of the DCT coefficients, or discarding the high frequency component coefficients have been employed to reduce the volume of data to be transmitted, thereby increasing the ability to transmit compressed video images. These techniques, however, when employed, produce decoded images that can be strongly distorted when compared to the original images. One type of commonly occurring distortion is referred to as "mosquito noise", since its appearance in a decoded video segment gives the illusion of "mosquitoes" closely surrounding objects. "Mosquito noise" is caused by the coarse quantization of the high frequency component coefficients which are generated from contours, edges, or strongly textured patterns contained in the original video image.

In order to reduce distortions, including "mosquito noise", postfilter arrangements, such as the one illustrated in FIG. 1, have been developed. In FIG. 1, there is shown in block diagram format, an example of a typical prior art postfilter arrangement in which image or video information is encoded in an encoder 110 and decoded in a decoder 120. An input signal from a conventional video camera such as the View Cam, manufactured by Sharp Corporation, is provided over line 101 to an encoder unit 111 in encoder 110. Encoder unit 111 codes the images received via the input signal and produces a compressed bitstream which is transmitted over communication channel 102. Communication channel 102 has a low transmission rate of, for example, 16 kilobits/second.

Coupled to communication channel 102, is decoder 120 which includes decoder unit 121 and postfilter 122. Decoder unit 121 is used to decompress the received bitstream and to produce decoded images. The decoded images are then improved by postfilter 122, which uses postfilter parameters to adjust filter strength, thus removing some of the distortions in the decoded video images that were produced in encoder 110 when the bitstream was compressed for transmission. The postfilter parameters used to adjust postfilter 122, are determined based on a combination of the frame rate and transmission rate of the encoded bit stream and are obtained from an empirical lookup table located in the decoder.

In general, postfilter arrangements, such as the one depicted in FIG. 1, tend to either over-filter decoded video images that are "clean" to begin with (i.e. fairly free of distortions), thereby unnecessarily blurring edges and texture, or to under-filter video images that are very noisy", leaving many of the stronger distortions in place. This is because the postfilter parameters used to control the strength of the postfilter, such as postfilter 122, are not determined based on the DCT coefficient quantization errors of the video images generated by the encoder, but rather are adjusted based on a combination of frame and transmission rates for the transmitted bitstream.

Another problem associated with the DCT method of coding video images, in low bit rate systems, is that the distortions which are produced during coding tend to affect various areas of the image without discrimination. Viewers of such decoded video images tend to find distortions to be much more noticeable in areas of interest to them. For example, in typical video teleconferencing or telephony applications the viewer will tend to focus his or her attention to the face(s) of the person(s) in the scene, rather than to other areas such as clothing and background. Moreover, even though fast motion in a coded image is known to mask coding distortions, the human visual system has the ability to "lock on" and "track" particular moving objects in a scene, such as a person's face. A postfilter arrangement such as the one illustrated in FIG. 1, when applied to distorted video images which contain facial regions, may result in facial features being overly smoothed-out giving faces an artificial quality. For example, fine facial features such as wrinkles that are present in the original video image could be erased in a decoded video image. Based on the above reasons, communication between users of very low bitrate video teleconferencing and telephony systems tend to be more intelligible and psychologically pleasing to the viewers when facial features are not plagued with too many coding distortions.

SUMMARY OF THE INVENTION

In accordance with the invention, there is provided an arrangement for adaptively postfiltering a decoded video image, wherein the postfilter parameters used to control the strength of the postfilter are computed by the encoder at the time of encoding and are transmitted to the postfilter via the decoder, as side information, in the video image bitstream. This postfiltering process removes distortions from the decoded video images, derived as a result of DCT coefficient quantization errors produced when the image is compressed for transmission to a decoder, and is based on computations of signal-to-noise ratios (SNRs), of one or more components of encoded video images. Other information about image content, such as face location information, can also be included in the side information sent to the postfilter in the video image bitstream, to modulate the postfilter strength according to the image content.

In an adaptive postfilter encoding arrangement input video images are provided to an encoder. The encoder codes the video images and computes the signal-to-noise ratio (SNR) between the encoded video image component (which is available at the encoder and is the same as the decoded image received by the decoder, in the case of no errors on the transmission channel) and the original video image component. The SNR provides a measure of the strength of the DCT coefficient quantization errors of the encoded image to be transmitted to the decoder. The higher the value of the SNR the higher the quality of the coded image. Based on the values of the SNR, the encoder selects a set of postfilter parameters for the postfilter to use for filtering the decoded video image components. By using a few bits per frame from the pool of bits allocated to encode the video image, the encoder sends the postfilter parameters to the postfilter via the decoder, as side information in the video image bitstream. In this way, the postfilter is made temporally adaptive, whereby postfilter parameters are automatically adjusted on a frame-by-frame basis, and does not under-filter or over-filter the received and decoded video images.

For those video images which contain areas of interest to a viewer, such as "head-and-shoulder" images, it is also possible to transmit face location parameters as side information in the video image bitstream to instruct the postfilter to modulate its strength according to the image content, so as to distinguish between facial and non-facial areas. As an example, the modulation could mean a reduction of the postfilter strength parameter by a fixed decrement. In this way the postfilter is made adaptive based on the content of the images.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

DETAILED DESCRIPTION

Figure 2:
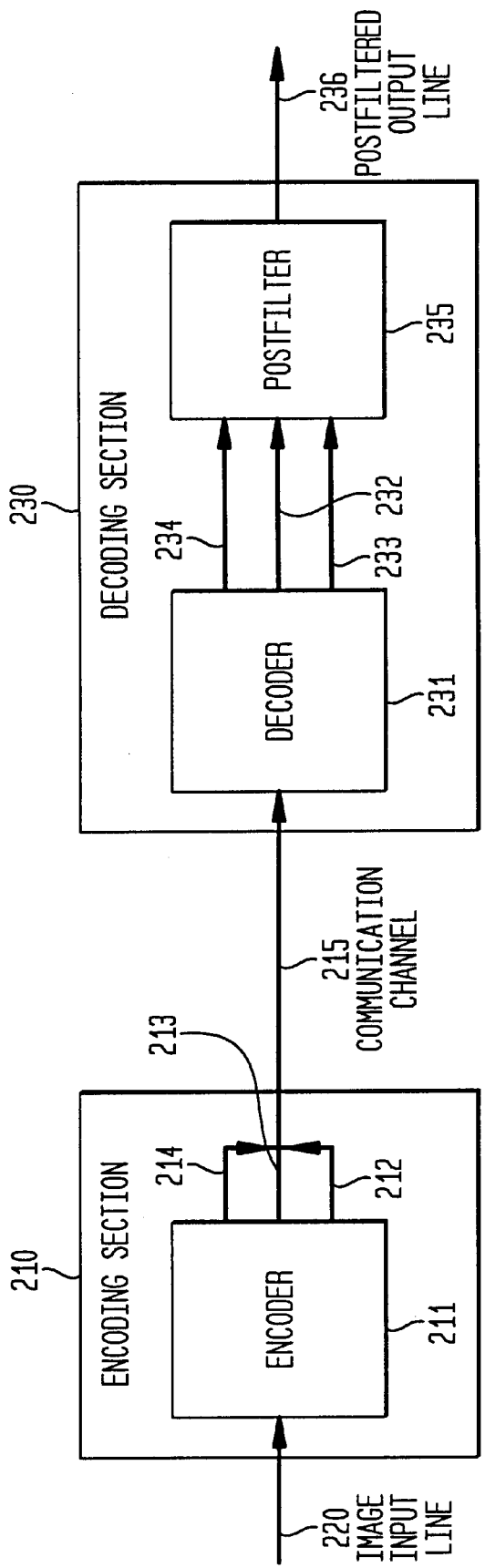
FIG. 2 shows an arrangement in accordance with the present invention where video images are adaptively post-filtered.

A block diagram of a video telephony apparatus involving the principles of the invention are shown in FIG. 2. The video telephony apparatus includes an encoding section 210 and a decoding section 230. Encoding section 210 accepts incoming video images on input line 220. Input line 220 is coupled to encoder 211, which has three output lines 212, 213 and 214, that are fed into communication channel 215. Output line 213 provides an encoded and compressed video image bitstream, output line 212 provides the optimal postfilter strength parameter, and output line 214 provides the face location parameters. Both postfilter parameters and face location parameters are transmitted as side information in the video image bitstream.

Communications channel 215 is connected through, for example, switches to decoding section 230 which accepts the incoming compressed video image bitstream. Communications channel 215 is coupled to decoder 231, which has three output lines 232, 233 and 234, that are connected to postfilter 235. Decoder 231 decodes the video image received in the incoming bitstream and supplies the video image on output line 232 to postfilter 235. Decoder 231 forwards the postfilter parameter, transmitted as side information included in the video image bitstream on output line 233 to postfilter 235. Decoder 231 also forwards face location parameters on output line 234 to postfilter 235. Postfiltered video images are output from decoding section 230 on postfiltered output line 236.

Figure 3:
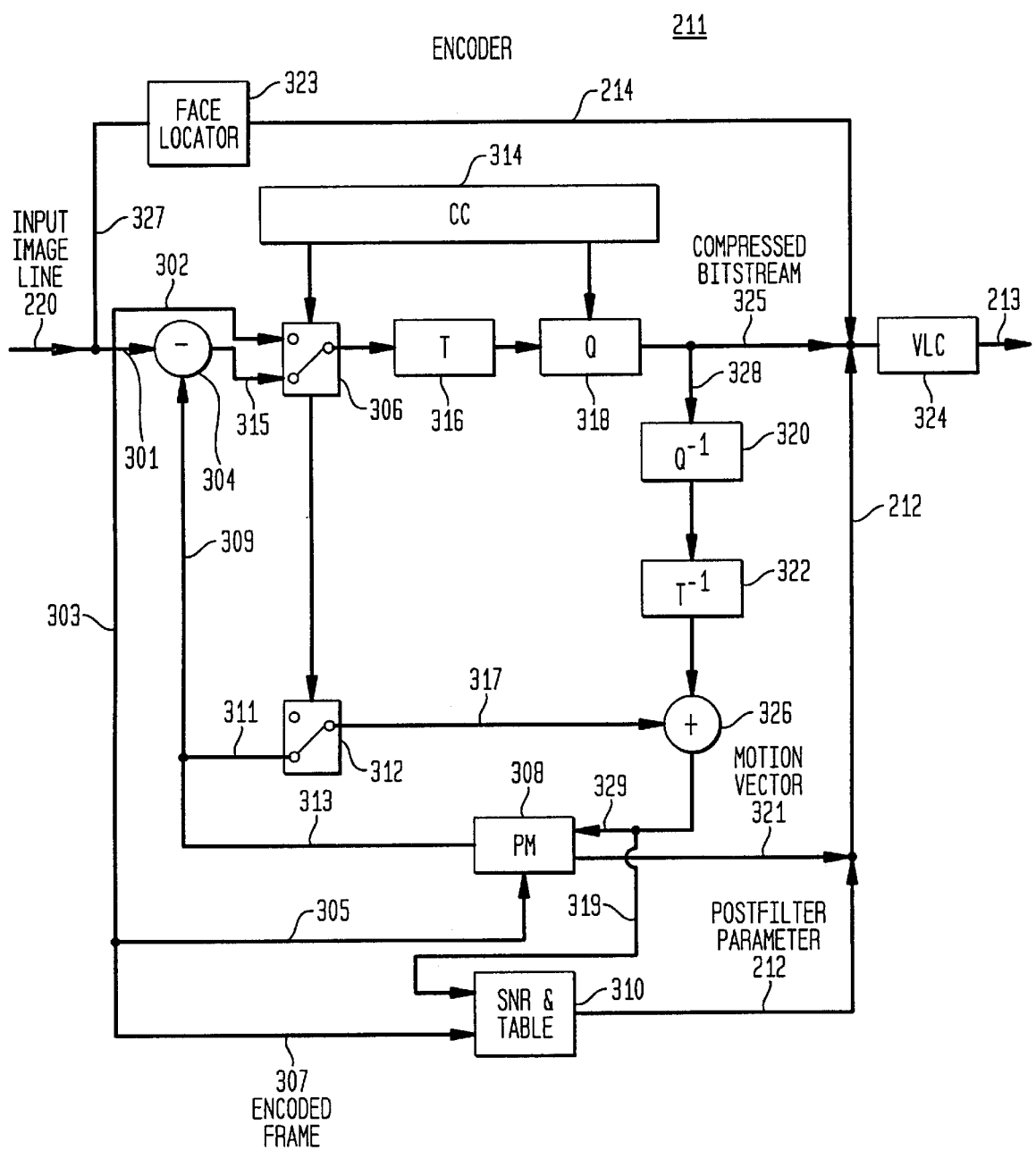
FIG. 3 shows a schematic of the encoder section.

Having described the general operation of the video telephony apparatus, the inventive concept will now be described by reference to FIGS. 3 and 4. As can be observed from FIG. 3, a portion of the block diagram of encoding section 210 has been redrawn to better describe encoder 211 and illustrate the inventive concept. An input color video signal in YUV format from a conventional video camera, such a the View Cam, manufactured by Sharp Corporation, is provided to encoder 211 over line 220 to subtractor 304, switch 306 along line 302, prediction memory 308 along lines 303 and 305 and SNR & table 310 along lines 303 and 307. Color digital images are typically available in the standard YUV color video format, where the Y component is the luminance component, and the U and V components are the chrominance components which convey color information. For luminance images of size M×N, the chrominance images are of size M/2×N/2, (i.e., downsampled by a factor of two) in both the horizontal and vertical directions. Subtractor 304 is also coupled to switch 306 along line 315, switch 312 along lines 309 and 311 and prediction memory 308 along lines 309 and 313. Coding control 314 is coupled to switch 306 and quantizer 318. Switch 306 is also coupled through transform 316 to quantizer 318. Quantizer 318 is coupled to variable length coder 324 along line 325 and inverse quantizer 320 along line 328. Variable length coder 324 is coupled to output line 213 which transmits the compressed video bitstream. Inverse quantizer 320 is coupled to prediction memory 308 through inverse transform 322 and adder 326. Switch 312 is also coupled to adder 326 along line 317. Prediction memory 308 is coupled to SNR & table 310 along line 319. SNR & table 310 is coupled to line 325 along line 212 which transmits the postfilter parameters to variable length coder 324 to be included as side information in the compressed bitstream of line 212. Face locator 323 receives input video images along line 327 and is coupled to line 325 along line 214 which transmits the face location parameters to variable length coder 324 to be included as side information in the compressed bitstream of line 212.

The operation of encoder 211 may be explained by describing its function in encoding video images. With reference to FIG. 3, a video image is input to source coder 211 along line 220 and to the first input of switch 306 along line 302. The motion-compensated previous reconstructed frame is available at the output of prediction memory 308 and is fed to difference 304 along lines 313 and 309. A motion-compensated difference image is formed at the output of the difference 304 and is fed to the second input of switch 306 along line 315.

For each video image scanned in zig-zag fashion from upper-left to lower-right, the coding control 314 decides whether it is more advantageous to code image blocks in INTRA mode—i.e. computing DCT coefficients for the image block itself (switch in the upper position), or in INTER mode—i.e. computing DCT coefficients for a motion-compensated image residual available at the output of difference 304 (switch 306 in lower position), and controls switch 306 accordingly. Switch 312 is synchronized with switch 306 and is therefore subjected to the same control. The data block at the output of switch 306 is transformed by the transform 316 and the coefficients of the transformed block are quantized by uniform quantizer 318 whose quantization step is controlled by coding control 314.

The quantized DCT coefficients output by quantizer 318 are also used to reconstruct the next motion-compensated previous reconstructed frame on lines 313 and 309. They are first inverse-quantized by inverse quantizer 320 and inverse-transformed by inverse transform 322. If the data was coded in INTRA mode (switch 312 in the upper position), the inverse transformed data is directly written into prediction memory 308 as reconstructed data. If the data was coded in INTER mode (switch 312 in the lower position), the inverse transformed data is first added to motion-compensated data from the previous reconstructed frame on line 313, 311, and 317, by adder 326. In both cases, reconstructed (or encoded) data for the current frame is available at the output of adder 326. Prediction memory 308 computes motion vectors for the current original image and writes those motion vectors onto the bitstream on lines 321 and 212. The bitstream corresponding to quantizer coefficients and motion vectors are Huffman coded by variable length coder 324 and are transmitted to the communication channel on line 213.

Face locator 323, such as described in related patent application Ser. No. 08/500672 filed on Jul. 10, 1995, and which is incorporated by reference, identifies elliptical head outlines and rectangular facial areas containing eyes, nose and mouth of people present in the video images to encode. The upper-left and lower-right corners of these identified rectangular areas are written onto the bitstream on line 325 via line 214.

The SNR for each video image component between the input frame on lines 303, 307 and reconstructed frame on line 329 is computed, and postfilter parameters are derived from a look-up table in SNR & table module 310. During a training phase at the encoder side, a look-up table of optimal postfilter parameters is generated for each component of input color images at specified spatial resolutions (SQCIF—128 pixels per line, QCIF—176 pixels per line and CIF—352 pixels per line), as a function of the signal-to-noise ratio (SNR) of the encoded frame components. This training is done off-line on a number of typical video sequences and prior to any video image transmission. To achieve adaptive postfiltering, postfilter coefficients are looked-up, on a frame-per-frame basis at the encoder side in a table generated in SNR & table module 310 and are transmitted as side information in the compressed bit stream transmitted along communication channel 215 to the decoder 231 and postfilter 235 depicted in FIG. 2.

Figure 1:
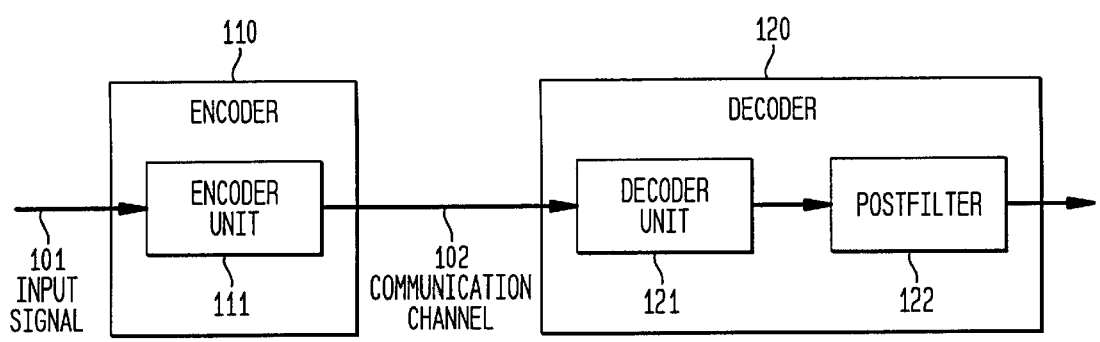
FIG. 1 shows a system in which video information is encoded and decoded.

The post filter parameters can be integrated into the bitstream itself as, by way of example, extra insertion/spare information bits (PEI/PSPARE information) in a bitstream which conforms to International Telecommnunication Union—Telecommunication Standardization Sector (ITU-T document "Recommendation H.263 (Video coding for narrow communication channels)", which is incorporated herein by reference. This would enable encoder 211 to still be able to function with a non-adaptive decoder, such as decoder 120 shown in FIG. 1. When an encoder such as encoder 110 transmits a signal to the decoder 231, the post filter parameters for postfilter 235 are obtained from an empirical look-up table available in the decoder which contains different entries for different combinations of input image resolutions, frame rates and transmission rates in the same manner as for the prior art decoder 120, shown in FIG. 1.

Figure 5:
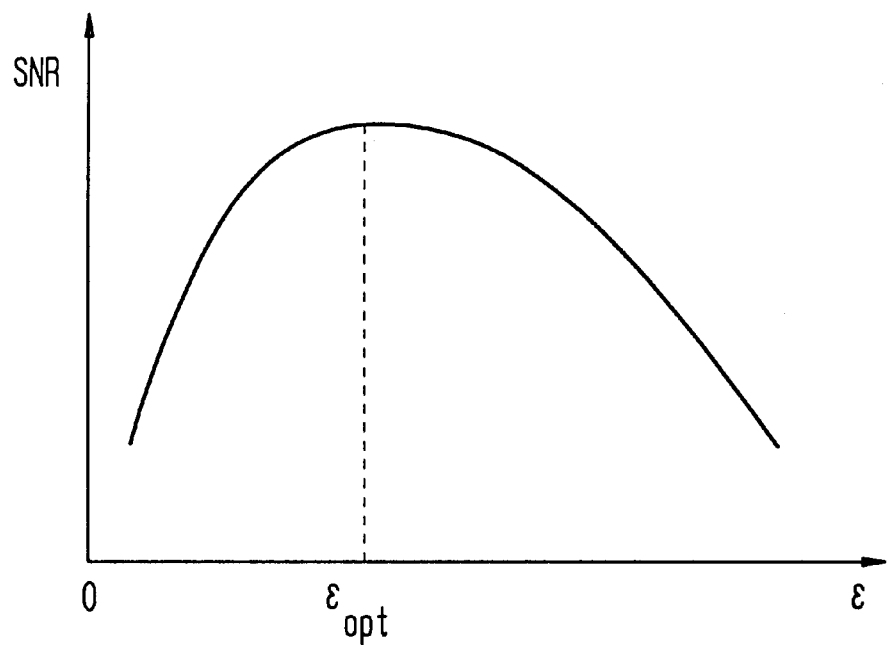
FIG. 5 shows a graph depicting the evolution of the SNR between original and postfiltered video images with respect to postfilter strength parameter, $\epsilon$.
Figure 6:
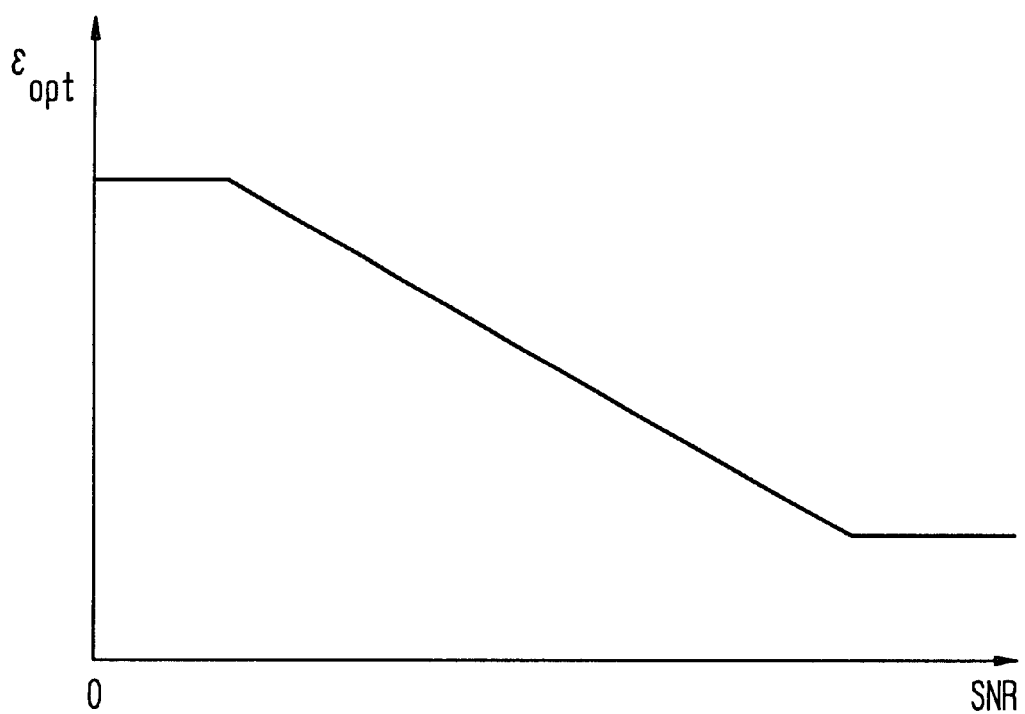
FIG. 6 shows a graph illustrating the relationship between the optimal postfilter parameter $\epsilon_{opt}$ and the SNR of an encoded video image.

The training phase, which results in the look-up table of SNR & table module 310 provides, for any value of the SNR between an original and an encoded frame, numerical value of the postfilter parameter, $\epsilon$. For each standard spatial resolution (e.g., SQCIF, QCIF, and CIF) a video sequence including frames with scenes of varying complexity and semantic content (e.g., one or more persons in the scene) are divided into arrays of M×N image blocks with each image block consisting of image samples denoted by locations (i, j). Image samples in each location (i, j) are encoded by encoder 211 using various combinations of the transmission rate and frame rate. For each image sample of the encoded frames, postfilter 235 is applied with a range of values of the postfilter parameter, for example all integer values between 1 and 30, and the SNR between the resulting postfiltered image and the original is computed and recorded. The SNR of a postfiltered video image component can be measured according to the formula:

$$SNR = 20\log_{10}\frac{255}{\sqrt{MSE}}$$

where, MSE denotes the mean square error which is calculated from $$MSE = \frac{\sum_{i=1,j=1}^{M,N}(x_{i,j}-y_{i,j})^2}{M,N}$$

where $x_{i,j}$ denotes the pixel values for image samples at location (i, j) in the original image and $y_{i,j}$ denotes the pixel values for image samples at location (i, j) in the postfiltered image. This computation results in the curve as shown in FIG. 5, with a single maximum obtained for the optimal value $\epsilon_{opt}$ of the parameter $\epsilon$. These values of $\epsilon$ are averaged-out over a complete encoded sequence, as well as the values of the SNR between encoded (but not postfiltered) image samples and original image samples, to provide each data point of the graph of FIG. 6. Data points can be generated, for example, all corresponding to different video sequences, bit rates and frame rates, therefore covering the range from very low to very high quality encoding. The curve of FIG. 6 can be obtained finally, by, for example, piecewise least-squares fitting.

Figure 4:
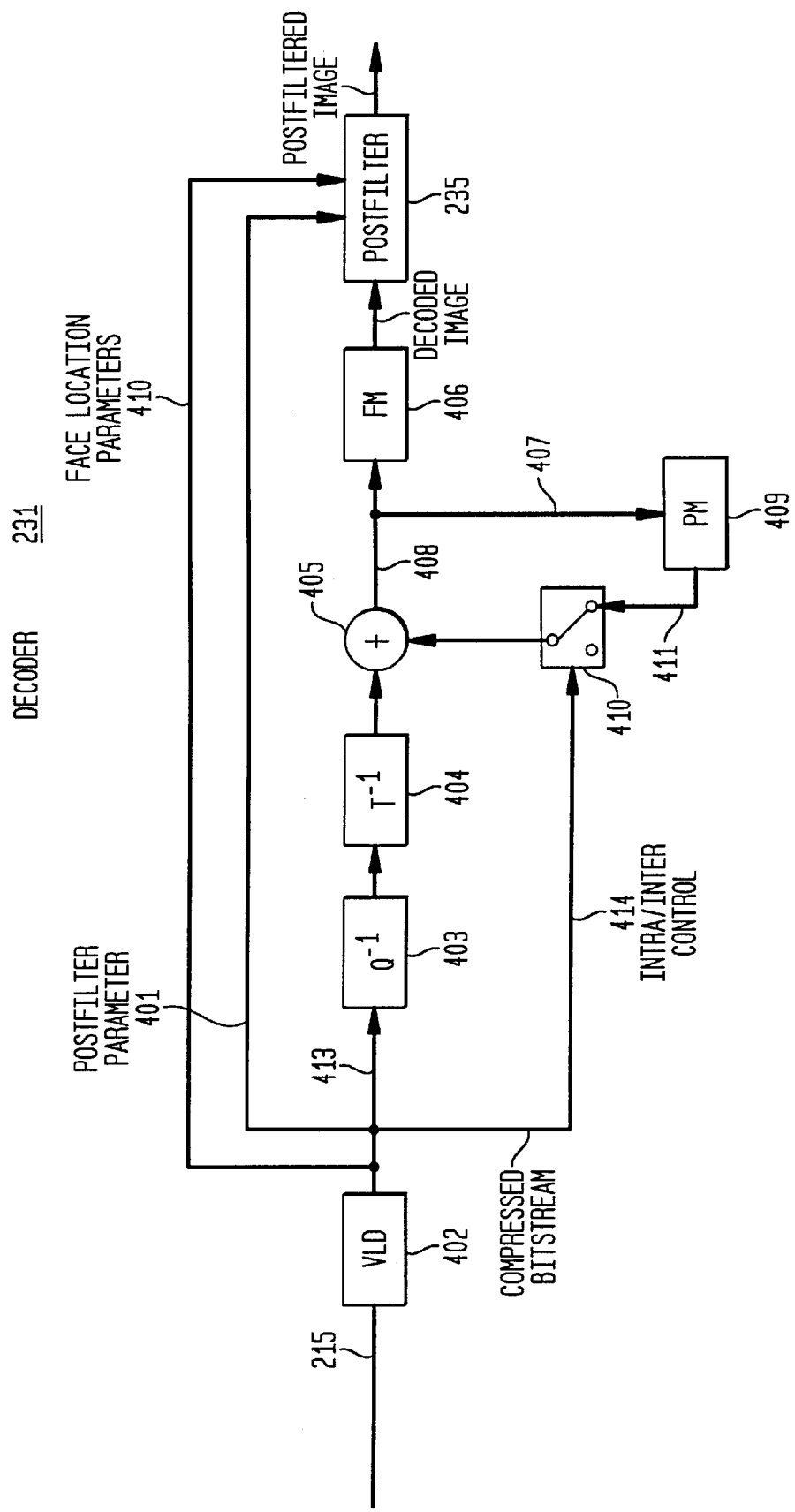
FIG. 4 shows a schematic of the decoder section.

As can be observed from FIG. 4, a portion of the block diagram of decoding section 230 has been redrawn to better describe decoder 231 and illustrate the inventive concept. Communications channel 215 is coupled to input the compressed bitstream containing the encoded video images and the postfilter parameter to decoder 231. At the input to decoder 231, communication channel 215 is coupled to variable length decoder 402. Variable length decoder 402 is coupled to postfilter 235 along line 401 so as to forward postfilter parameter bits to the postfilter and to postfilter 235 along line 410 to forward face location parameters. Variable length decoder 402 is coupled to switch 410 via line 414 to provide INTRA/INTER control information. Variable length decoder 402 is also connected along line 413 to inverse quantizer 403 which is coupled to inverse transform 404. Inverse transform 404 is coupled to frame memory 406 through adder 405 and line 408. Frame memory 406 is coupled to postfilter 235 to supply the decoded video image for postfiltering. Line 408 is also coupled via line 407 to prediction memory 409, switch 410 and to adder 405.

The decoder operates very similarly to the prediction loop of encoder 211. Variable length decoder 402 decodes information of four different types: i) INTRA/INTER coding type bits which control switch 410 through line 414, ii) quantized transform coefficients on line 413 which are successively fed to inverse quantizer 403 and inverse transform module 404, iii) postfilter parameters input to the postfilter module 235 via line 401, and iv) face location parameters also input to postfilter 235 via line 410. In INTRA mode (switch 410 to the left), inverse transformed data is directly written into prediction memory 406 as reconstructed (or decoded) data. In INTER mode (switch 410 to the right), the inverse transformed data is first added to motion compensated data from the previous reconstructed frame on line 412, by adder 405. The reconstructed (or decoded) frame at the output of frame memory 406 is input to postfilter 235. An adaptively postfiltered image is produced at the output of postfilter 235, where the adaptation is both temporal, with optimal filter strength received at every frame according to encoding quality and based on image content, with modulation of the parameter $\epsilon_{opt}$ in facial areas.

The foregoing merely illustrates the principles of the invention and it will thus be appreciated that those skilled in the art will be able to devise numerous alternative arrangements which, although not explicitly described herein, embody the principles of the invention and are within its spirit and scope.

For example, although the invention is illustrated herein as being implemented with discrete functional building blocks, e.g. encoders, and decoders, the functions of any one or more of those building blocks can be carried out using one or more appropriate programmed processors, e.g., a digital signal processor.

The invention claimed is:

1. A method of postfiltering low bitrate visual telephony images, comprising the steps of:

inputting a video image to an encoder;

encoding said video image and determining a postfilter parameter in said encoder, wherein said postfilter parameter is determined based on the signal-to-noise ratio (SNR) between the encoded video image and the input video image;

transmitting said encoded video image and said postfilter parameter to a decoder;

decoding said transmitted video image in said decoder and postfiltering said decoded video image using said postfilter parameter; and displaying the postfiltered video image.

2. The method of claim 1, wherein said postfilter parameter comprises one scalar parameter for the Y (luminance) color image components.

3. The method of claim 1, wherein said postfilter parameter comprises a plurality scalar parameters, one for each component of a color image in YUV format.

4. The method of claim 1, wherein said postfilter parameter is transmitted to said decoder as a plurality of bits included in the encoded video image bitstream.

5. The method of claim 4, wherein said plurality of bits are located in the PEI (extra insertion information) and PSPARE (spare information) bits of the transmitted bitstream.

6. The method of claim 1, further comprising the step of transmitting a face location parameter to said decoder.

7. The method of claim 6, wherein said face location parameter is transmitted to said decoder as a plurality of bits included in the encoded video bitstream.

8. The method of claim 7, wherein said plurality of bits are the PEI (extra insertion information) and PSPARE (spare information) bits.

9. An apparatus for postfiltering low bitrate visual telephony images, comprising an encoder for encoding an input video image and for determining a postfilter parameter, wherein said postfilter parameter is determined based on the signal-to-noise ratio (SNR) between the encoded video image and the input video image; and a decoder for receiving said encoded video image and said postfilter parameter transmitted over a communications channel and for decoding said encoded video image, said decoder including a postfilter for postfiltering said decoded video image using said postfilter parameter.

10. The apparatus of claim 9, wherein said postfilter parameter comprises one scalar parameter for the Y (luminance) color image components.

11. The apparatus of claim 9, wherein said postfilter parameter comprises a plurality of scalar parameters, one for each component of a color image in YUV format.

12. The apparatus of claim 9, wherein said postfilter parameter is transmitted to said decoder as a plurality of bits included in the encoded video image bitstream.

13. The apparatus of claim 12, wherein said plurality of bits are located in the PEI (extra insertion information) and PSPARE (spare information) bits of the video image bitstream.

14. The apparatus of claim 9, wherein the decoder further receives a face location parameter transmitted over said communications channel.

15. The apparatus of claim 14, wherein said face location parameter is transmitted to said decoder as a plurality of bits included in the encoded video image bitstream.

16. The apparatus of claim 15, wherein said plurality of bits are the PEI (extra insertion information) and PSPARE (spare information) bits.

* * * * *